May 31, 1960     E. R. PRICE ET AL     2,938,348
BOOSTER FOR POWER-ASSISTED HYDRAULIC BRAKING SYSTEM
Filed Feb. 3, 1954     3 Sheets-Sheet 3
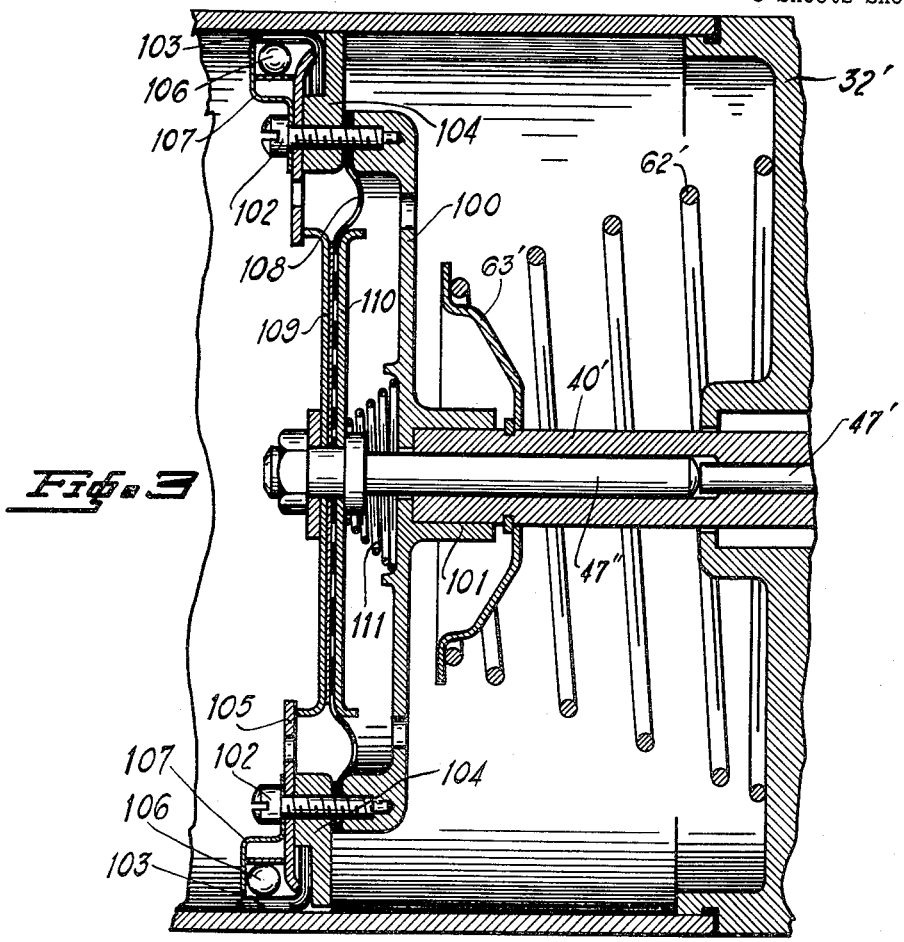
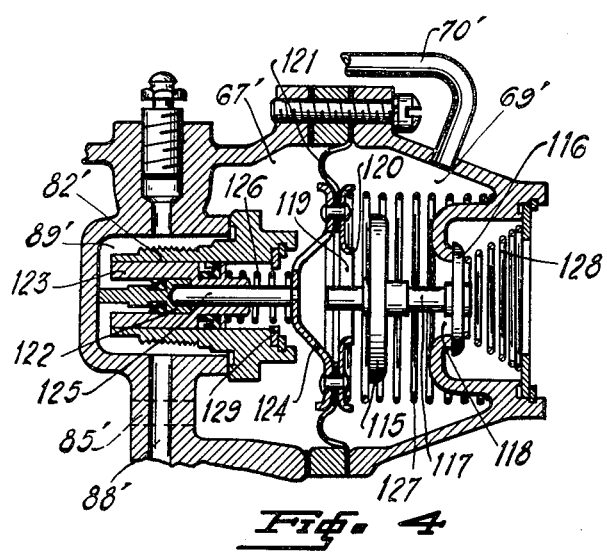
INVENTORS
EARL R. PRICE
BY EDWARD E. HUPP
ATTORNEY

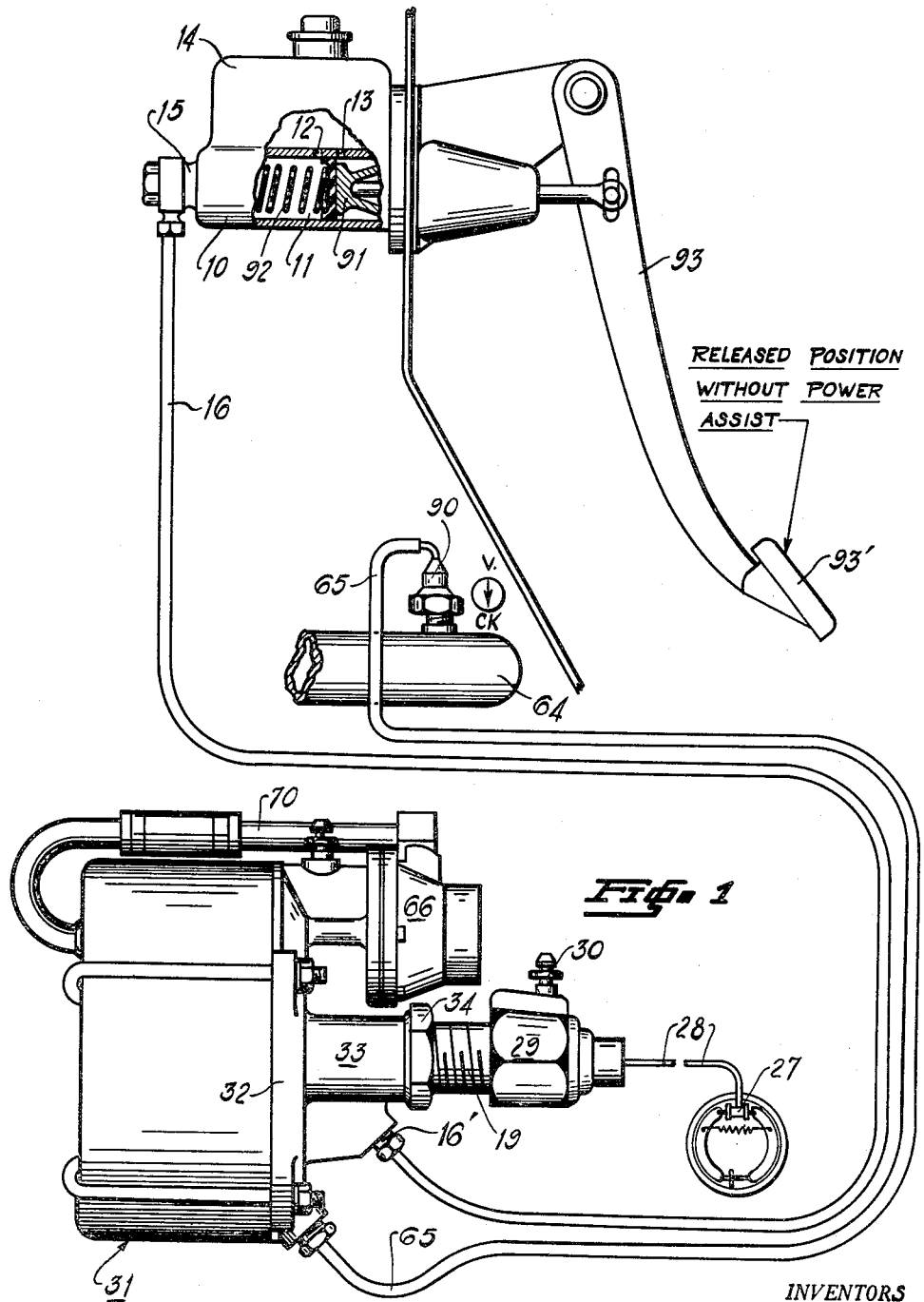

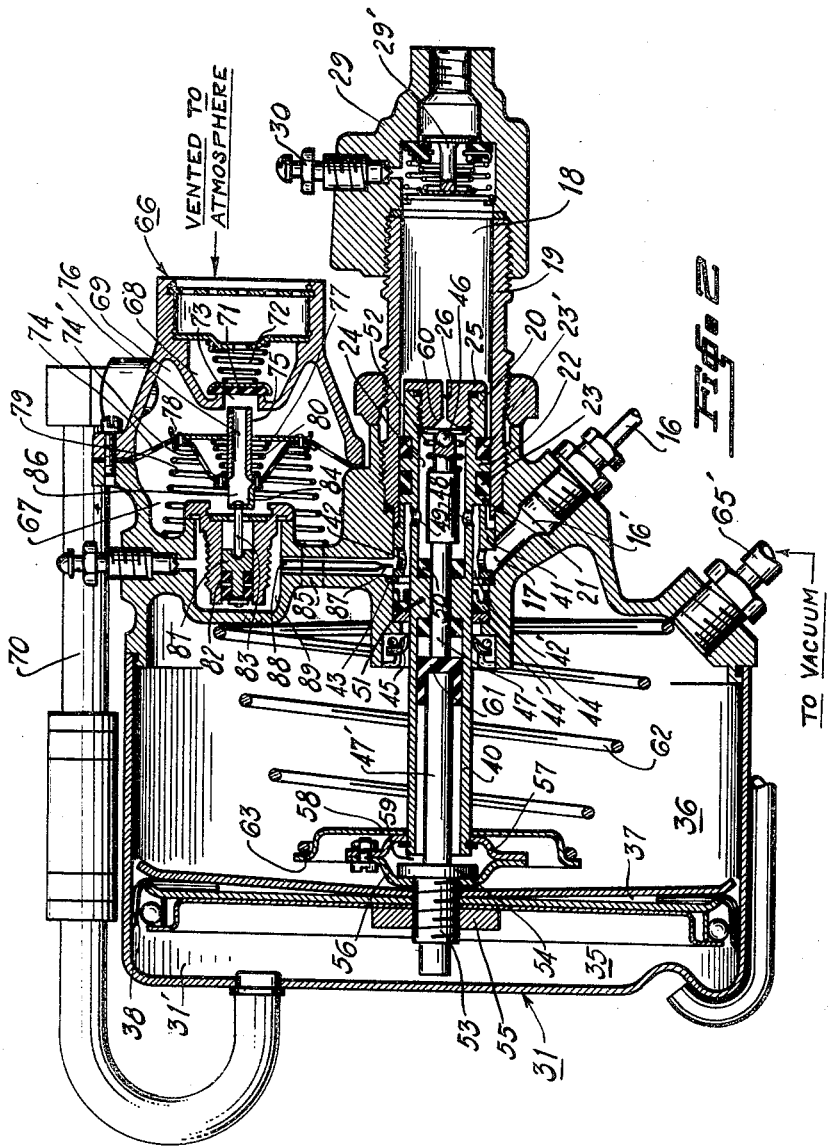

United States Patent Office 2,938,348
Patented May 31, 1960

2,938,348

BOOSTER FOR POWER-ASSISTED HYDRAULIC BRAKING SYSTEM

Earl R. Price and Edward E. Hupp, South Bend, Ind., assignors to Bendix Aviation Corporation, South Bend, Ind., a corporation of Delaware Filed Feb. 3, 1954, Ser. No. 407,924

11 Claims. (Cl. 60—54.6)

This invention relates to improvements in boosters for hydraulic pressure systems, and is particularly concerned with air-differential power boosters for use in hydraulic braking systems incorporating a booster-operated slave cylinder hydraulically connected to the brake cylinders or motors and a manually-actuated master cylinder which latter, during normal braking conditions with power-assistance, functions primarily to operate a control valve or like device for energizing the booster. A widely-used type of such braking system has an input side consisting of the manually-actuated master cylinder, the hydraulically-operated device for operating the booster control valve, and a follow-up variable volume chamber which is in hydraulic communication with the manually-operated master cylinder and the booster control valve and increases in volume as the booster-operated slave cylinder piston advances on its power stroke to displace fluid in the slave cylinder; and an output side which includes the slave cylinder, the brake cylinders or motors and the hydraulic fluid lines which connect the slave cylinder to said cylinders or motors. The slave cylinder piston, which in effect separates the input and output sides of the system, has a port or passage therethrough which is closed by a valve member when the power piston initially advances on its power stroke but which is open when the power piston retracts and the system is at rest; and this port or passage functions both as a means for compensating for changes in volume of fluid in the system and to permit fluid to be displaced from the input to the output side through actuation of the brake pedal in the event of a power failure or disablement of the booster. It is important, however, that this port or passage be closed as soon as possible when fluid is initially displaced in the master cylinder to apply the brakes during normal operation (with power-assistance) and this is particularly true in low-input systems, i.e., those systems in which the ratio of input to output volume displacement is such as to require only a relatively small quantity of fluid to be displaced in the master cylinder in order to apply the brakes; and an object of the instant invention is to provide a power booster in which the loss of reserve fluid from the input to the output side of the system across the slave cylinder is held to a minimum during the braking operation.

Another object is to provide a power booster particularly adapted for hydraulic braking systems of the low-input, high-output type in that the booster incorporates improved means for reducing the fluid capacity of the input side to the desired ratio.

Another object is to improve the slave cylinder piston construction of the booster and the manner in which it is connected to the power piston.

Another object is to provide a control valve for the booster having improved operating characteristics.

A further object is to provide a power booster which operates smoothly and quietly.

The foregoing and other objects and advantages will become apparent in the light of the following description taken in conjunction with the drawings, wherein:

Figure 1 is schematic view of a power-assisted hydraulic braking system of the low-input, high-output type incorporating a power booster in accordance with the invention;

Figure 2 is an enlarged sectional view of the booster;

Figure 3 is a fragmentary sectional view of a modified form of power piston; and Figure 4 illustrates, in section, a modified type of control valve for the booster.

Referring to the drawings and first to Figures 1 and 2 thereof, the input side of the system includes a master cylinder 10, having a bore or chamber 11 therein, which communicates by means of the conventional compensation port 12 and recuperation port 13 with a reservoir 14, adapted to receive a reserve supply of hydraulic fluid. The discharge or outlet end 15 of the master cylinder connects by way of fluid line or conduit 16 and inlet passage 16′ with an annular chamber 17 (see Figure 2), which communicates with the control valve for the power booster in a manner to be described. A bore or chamber 18 is formed into a high-displacement slave cylinder 19, the latter sometimes being termed an auxiliary master cylinder or power-operated master cylinder; and a slave cylinder piston, generally indicated at 20, is arranged for reciprocatory movement in the bore or chamber 18 of the slave cylinder, said piston having spaced lands 21 and 22 and a pair of seal rings 23 and 23′ associated therewith, which wipe the wall of the bore 18. The piston 20 is hollow, providing a central bore or chamber 24, which at its one end is internally threaded to receive a closure member in the form of a plug 25, formed with a restricted fluid passage 26, one function of which is to provide for compensation for any change in volume of fluid that may occur in the high-displacement side of the system. It is another function of the restricted passage to induce low "crack point" of the control valve to be described later. The high displacement side of the system includes the chamber 18, the brake-actuating cylinders or motors, one of which is shown at 27, Figure 1, and the brake lines communicating the discharge end of the slave cylinder with the brake motors, one of said lines being shown at 28 in Figure 1. At its discharge end, the slave cylinder 19 has threaded thereon an enlarged cap 29, in which is mounted the conventional residual pressure check valve 29′ and bleed screw 30.

The power booster is generally indicated at 31; it comprises a cup-shaped or deeply-dished shell or cylinder 31′, which at its front or right-hand end is connected in air-tight relation to a housing or casting 32, the latter being formed with a hollow central portion or boss 33, which at its front end is internally threaded to receive the contiguous end of the slave cylinder 19, which is locked in sealed, fluid-tight relation to said boss by a nut 34. The interior of the cylinder 31′ is divided into two chambers 35 and 36 by a pressure-responsive movable wall, here shown in the form of a piston 37, which may be of any preferred construction but is illustrated as being made up of a pair of discs having a flexible seal 38 clamped between the peripheral portions thereof and adapted to engage the inner surface of the shell or cylinder 31′.

A volume displacement member in the form of a plunger is indicated at 40; it is hollow and at its front extremity projects through the axial bore in the boss 33 and terminates in the form of the slave cylinder piston 20. A tubular spacer and stop member 41 is located in the bore of the boss 33 and has a number of holes or openings 42 formed through the wall thereof, to permit hydraulic fluid to pass from chamber 17 to an annular follow-up chamber 42', to be described. The front or right-hand end of the member 41 engages the land 21 of the slave cylinder piston 20 and acts as a stop to thereby determine the limit of the retractile stroke of the piston. At its rear or left-hand end, the ring 41 abuts a snap ring 43, and immediately to the left of the snap ring is a seal ring 44 and a bushing or bearing ring 44'. An additional seal assembly 45 is provided at the rear of the opening in the boss 33.

It will be observed that the exposed surface area of the land 21 of piston 20 constitutes a movable wall of follow-up chamber 42' and that the pressure developed in said chamber exerts a force on said area in a direction tending to move said piston into the slave cylinder chamber 18. As the piston advances into the chamber 18, the volume of chamber 42' increases. Since the chamber 42' forms part of the low displacement input system, it is important that the volume thereof be kept at a predetermined value for any given position of the piston 20 to obtain the desired volume ratio between fluid input and output; and this is accomplished by having the diameter of the plunger 40 relatively large throughout at least that portion of its length which has movement in said chamber.

A compensator-port-closing or control valve is indicated at 46; it is shown as "spun" into the hollow end of a combined thrust and compensator rod, which is preferably made in two parts, indicated at 47 and 47', for a purpose to be explained, but is hereinafter identified by the reference numeral 47 alone when referring to the rod as a unitary member. The rod 47 is enlarged at 48, to provide a shoulder or abutment for the one end of spring 52. Chambers or bore 24 is placed in communication with the chamber 42' by means of ports 49, formed in the wall of the displacement plunger 40. A seal ring 50 prevents leakage of fluid from chamber 24 around the rod 47 where the latter projects through a guide boss 51, formed internally of the plunger 40. The relatively light spring 52 exerts a force on the rod 47 in a direction tending to unseat the valve 46.

The displacement plunger 40 and compensator valve rod 47 are so connected to the power piston 37 that when the said piston is caused to initiate a power stroke, the compensator valve 46 is closed and the slave cylinder piston advanced into the bore or chamber 18 with the rod 47 taking the thrust load and the plunger 40 maintaining the volume of the follow-up chamber 42' at a value consistent with predetermined low input displacement requirements. The section 47' of the compensator rod 47 has a stud 53, formed with a collar 54, the stud projecting through the center of the piston 37 and the latter being clamped between an end nut 55 and a dished bracket or fitting 56, having its central portion engaged between the collar 54 and the contiguous side of the piston. A mating bracket or fitting 57 is connected to the bracket 56 and has an axial opening for receiving the adjacent end of the displacement plunger 40, the latter being provided with a stop ring 58 for maintaining the rod section 47' within the bracket enclosure. When the power piston 37 is at rest, the position shown in Figure 2, there is a space or clearance between the adjacent end of the plunger 40 and the collar 54, as indicated at 59, and this space is preferably slightly greater than the distance required for the valve 46 to seat at 60 and effectively seal the compensating port or passage 26 when the piston is caused to initiate a power stroke.

The cup-shaped member indicated at 61 is a combined damping and guide device which is interposed between the rod sections 47 and 47'; it tends to quiet the operation of the power unit by eliminating metallic ring or sounds when the rod 47 is advanced to close valve 46 and exert its thrust load on the piston 20; and it also serves to guide and steady the rod 47' and power piston 37 connected thereto.

A return spring 62 is provided for the power piston 37; it is of the conical type with its one end abutting a seat 63, which is loosely disposed on the plunger 40 and moves with the piston 37, and at its opposite end is seated on the relatively stationary casting or housing 32.

The power unit as here shown is of the vacuum-suspended type, i.e., the piston 37 is held in released position by the application of vacuum to opposite sides thereof and which sides are of equal effective area. It will be obvious, however, that the unit could be of the atmospheric-suspended type, i.e., the piston could be held suspended by venting the respective chambers 35 and 36 to the atmosphere. The type of power unit is a matter of choice, prompted by the character of the installation involved. In the example illustrated, the vacuum or sub-atmospheric pressure developed in the engine intake manifold, indicated at 64 in Figure 1, is utilized, the said manifold being connected by conduits 65 and 65' with chamber 36 of the power cylinder 31', and chamber 35 of the said unit may be selectively connected to chamber 36 or to the atmosphere at the will of an operator by means of the control valve assembly indicated at 66. Briefly, the control valve assembly comprises a vacuum chamber 67, an atmospheric chamber or inlet 68 and an intermediate valve chamber 69, the latter being in communication with the chamber 35 of the power cylinder by means of a conduit 70. A poppet valve 71, urged to its seat by a spring 72, controls atmospheric port 73, which when open communicates atmospheric pressure from chamber 68 to control chamber 69 and thence by way of conduit 70 to chamber 35. A reaction or "feel" diaphragm 74 separates vacuum chamber 67 from the chamber 69; it has a central primary or first stage reaction portion 74', which is sensitive to low differentials to give an initial reaction or "feel," when the fluid is initially displaced in the master cylinder 10 to open poppet valve 71, that is of less force or magnitude than the reaction force developed across the entire effective areas of the diaphragms 74 and 74'. A vacuum valve tube 75, which also serves as an unseating device for valve 71, is connected to the central portion of the diaphragm 74 and has a central passage 76 (which in effect constitutes a vacuum port) by means of which the vacuum existing in chamber 67 is communicated to chamber 69 when the poppet valve 71 is closed and power piston 37 is in released position. A contact plate is connected to the diaphragm 74 where the latter merges with the central portion 74' and is normally urged against the web portions or radial arms of a spider 78 by a counter-reaction spring 79. A light biasing spring 80 is interposed between said plate and the central portion 74' of the diaphragm and urges the tube 75 away from the valve 71. A hydraulic valve piston 81 is reciprocably mounted in a cylinder 82 and is connected by a stem 83 and ported member 84 to the valve tube 75, the central portion 74' of diaphragm 74 being clamped between flanges formed on the member 84 and the adjacent end of tube 75. Vacuum existing in power cylinder chamber 36 is communicated to chamber 67 of the control valve by way of passage 85 (shown in dotted lines), and from this latter chamber, it may be communicated to chamber 69 by way of port or ports 86 in the member 84 and passage 76 in tube 75. Hydraulic fluid under pressure for operating the control valve flows from chamber 17 by way of restriction 87 and passage 88 to chamber 89, where it acts on the exposed end surface area of the valve piston 81.

The member indicated at 90 in Figure 1, where vacuum line 65 is tapped into the manifold 64, is a vacuum check valve for trapping vacuum in chamber 36 when the vehicle engine stops and also for maintaining the operating vacuum or pressure in said chamber at its highest operating or holding value when the power piston 37 is at rest.

Fluid may be displaced in the master cylinder 10 by means of a piston 91, which is normally urged to retracted position by a spring 92 and is moved in a fluid-displacing direction into the cylinder by a manually-operable member shown in the form of a pedal 93 provided with a foot pad 93'.

OPERATION

Let it be assumed that the hydraulic system is filled with fluid and that with the parts in the positions as shown in Figure 2, fluid is displaced in the master cylinder 10 to apply the brakes. This action will also displace or pressurize fluid in line 16, passage 16', chamber 17, passage 88 and chamber 89, moving valve piston 81 to the right and with it valve tube 75, the latter first engaging poppet 71, which action effects closure of the vacuum port or passage 76 and hence closes off vacuum from chamber 76, and substantially at the same time unseats poppet 71 and admits atmospheric pressure to chamber 69, conduit 70 and booster chamber 35, whereupon a pressure differential is developed across piston 37 and the latter moves forward or to the right on a power stroke. The initial movement of piston 37 toward the right seats valve 46, which action seals off the low-displacement side of the system from the high-displacement side. The thrust load is preferably taken primarily by the rod 47', an important function of the plunger 40 being to reduce the volume of the low-displacement input system. The slave cylinder piston is now advanced into the chamber 18 to apply the vehicle brakes in the conventional manner. As the piston 20 moves to the right on its power stroke, the volume of chamber 42' increases; and should the brake pedal be held stationary at a given brake-applied position, the piston 81 will retract to a point where atmospheric poppet 71 and vacuum tube 75 are each in closed or "lapped" position, thereby holding the power piston at a given position in accordance with the position of the brake pedal. In other words, the system is a "follow-up" system because slave cylinder displacement is proportional to pedal movement.

When the brake pedal is released, the pressure in chambers 42 and 89 is reduced, piston 81 retracts, atmospheric poppet 71 closes and passage 76 opens. Vacuum is now communicated to chamber 69 and thence by way of conduit 70 to chamber 35, the air pressure differential across the power piston 37 becomes zero and spring 62 returns said piston to its retracted position. As the power piston is returned by spring 62 to its fully retracted position, spring 52 moves compensator rod 47 to the left and unseats valve 46. Compensation for any change in volume of fluid in the slave cylinder 18 can now take place through restricted passage 26.

The displacement of fluid in the master cylinder 10, under normal operating conditions, viz, with power assistance, need only be sufficient to take care of the displacement in follow-up chamber 42 plus that required to operate the valve piston 81, it being understood, of course, that the slave cylinder 19 will have sufficient displacement to take care of the brake motors or cylinders and/or other load devices. The total hydraulic pressure created and transmitted to the brake motors is the sum of the pressure developed by the thrust of the power piston and the hydraulic pressure acting on the land 21 of the slave cylinder piston 20.

The diaphragm 74 of the control valve assembly may be considered a reaction member in that when poppet 71 is unseated, there is a differential pressure developed across the diaphragm which is proportional to the differential developed across power piston 37. The differential across diaphragm 74 exerts a force in opposition to movement of valve piston 81 which is proportional to but considerably less than the force exerted by the power piston in advancing the slave cylinder piston 20; and this opposing force produces a reaction pressure in the master cylinder 10 which gives the desired "feel" to an operator when applying the brakes. This reaction force may be considered as taking place in two stages. The first stage is of less magnitude than the second and occurs as the poppet valve 71 opens and the differential builds up across the diaphragms 74 and 74'. During this period the differential developed across the diaphragm 74' produces the initial or first stage reaction force; and this merges into the second stage as the differential overcomes the force of spring 79 and the plate 77 contacts or "bottoms" on the flanged left-hand end of tube 75.

There are certain advantages in having the volume displacement member 40, the slave cylinder piston 20 and the combined valve closure member and push rod 47 constructed and arranged as shown in Figure 2. Heretofore, as far as known, it has been the practice, in low input systems utilizing a slave cylinder piston having a port or passage which when open connects the input and output sides of the system, to combine the functions of the volume displacement member with those of the push rod by making these parts as a single unit, which was done by enlarging at least that portion of the push rod which projects into the follow-up chamber. This necessitated making the slave cylinder piston separate from the push rod, since the push rod must have movement relatively to said piston in order to function as a valve closure device. Such construction resulted in too much surface area exposed to hydraulic pressures reacting in a direction counter to the thrust exerted by the booster, or in a direction tending to back the push rod and piston out of the slave cylinder. Such reaction surface area should be held to a minimum since otherwise, under certain conditions of the braking operation, the slave cylinder piston and push rod might be forced out of the hydraulic portion of the system and the brake pedal or treadle bottomed on the floor board before the brakes are applied with the required force. An example is when the fluid pressure developed in the input side exceeds "power run-out," that is, a pressure producing a force in excess of that produced by the power piston and which latter force is determined mainly by the then available manifold pressure and effective area of said piston. Should the reactive force cause the push rod to back off and open the port or passage across the slave cylinder piston, not only will reserve fluid be lost on the input side of the system, but the differential developed across the piston itself will move the latter back with the push rod, resulting in a loss of braking effort.

By referring to Figure 2, it will be noted that the only reactive area of the rod 47 which is not balanced out with respect to pressures developed in chamber 24 is that resulting from the relatively small diametric portion of the rod where it projects through the seal 50. As for the volume displacement member 40, the relatively small reactive surface area exposed to the pressures in chamber 24 is more than balanced out by the area of the land 21 exposed to like pressures developed in the follow-up chamber 42'. Hence it is virtually impossible to create a line pressure on the input side of the system of such magnitude as to back the rod 47 out of valve-closing position during the braking operation. Also, by eliminating unbalanced reactive surfaces on the member 40, hydraulic pressures developed in the input side will be fully utilized in aiding fluid displacement movement of the slave cylinder piston. Furthermore, by making the slave cylinder piston integral with the member 40, renders it virtually impossible to produce play between these parts or to separate one from the other.

Figure 3

A modified form of power piston is shown in Figure 3 which is more sensitive to low differential pressures than the power piston of Figure 2. In Figure 3, parts which find their substantial equivalents in Figure 2 are designated by like reference numerals with the addition of a prime (').

The piston as a whole comprises a supporting plate or bracket 100 having a central hollow boss 101, which receives the contiguous end of the volume displacement member 40', and a thickened peripheral portion to which is attached, by screw bolts 102, an outer piston assembly made up of a flexible seal 103, retaining and stiffening rings 104 and 105, flexible backing ring 106 and retainer 107. A low-differential diaphragm 108 has its peripheral portion clamped between the ring 104 and plate 100 and its central portion clamped between a pair of stiffening plates 109 and 110. A biasing or return spring 111 normally urges the diaphragm to null position with the peripheral edge of plate 109 contacting the inner edge of ring 105. Push rod 47'' has its contiguous end secured to the central portion of diaphragm 108.

When the booster control valve is operated to establish a differential pressure across the power piston of Figure 3, the diaphragm 108 initially responds in advance of the piston as a whole and moves the push rod 47'' to the right to seat the valve 46 of Figure 2 and close the passage 26 across the slave cylinder piston 20. Then as the differential becomes effective across the entire piston, the outer portion of the latter, including the plate 100, follows and transmits displacement thrust to the slave cylinder piston through the volume displacement member 40'.

*Figure 4*

Figure 4 illustrates a modified form of control valve with respect to the valve 66 of Figures 1 and 2, wherein a low poppet valve crack point is obtained, that is, the valve which controls the differential across the power piston is responsive to low hydraulic input pressures. Here, as in Figure 3, parts which find their substantial equivalents in Figure 2 are designated by like reference numerals with the addition of a prime (').

A pair of poppet valves 115 and 116 are connected by a stem 117 for movement in unison, valve 116 controlling atmospheric port 118 and valve 115 controlling vacuum port 119, defined by a seat 120, carried by a reaction diaphragm 121. A pair of coacting inner and outer valve operating pistons are indicated at 122 and 123, the inner piston being mounted for limited sliding movement in the outer piston and the latter being slidable in cylinder 82'. The diaphragm 121 and valve seat 120 are connected by means of a spider 124 to a piston rod 125, which slidably projects through the outer piston 123 and has its left end portion contoured to fit into a socket formed in the adjacent end of the inner piston 122; and said diaphragm and valve seat also having a resilient connection with the outer piston 123 through a calibrated spring 126, which is interposed between the right end of the said outer piston and said spider. A return spring 127 normally urges the movable valve seat 120 clear of poppet valve 115, and another spring 128 urges poppet valve 116 to seated or closed position. A stop ring 129 limits movement of the piston 123 toward the right as viewed in Figure 4.

In the respective positions of the parts as shown in Figure 4, the poppet valve 115 is unseated and poppet valve 116 is seated, communicating chambers 35 and 69' with vacuum and cutting off atmospheric pressure from these chambers. If now the brake pedal is depressed, hydraulic pressure will be communicated to chamber 89' by way of input line 16, passage 16', annular chamber 17 and passage 88'. In the arrangement as shown in Figure 4, the area of the outer piston 123 exposed to the pressure in chamber 89' is considerably greater than that of the inner piston 122. Hence, the outer piston is more sensitive to the initial build-up of such pressure and will immediately move to the right and load spring 126 to a point where seat 120 is moved into engagement with poppet 115. A further build-up of hydraulic pressure in the chamber 89' will crack the poppet valve 116, thus admitting atmospheric pressure to the chamber 69'. This pressure acts on the effective area of diaphragm 121 further compressing the spring 126 and lapping the poppet valve 116. This action continues as additional braking is required until the outer piston engages the stop 129, at which time the inner piston 122 supplies the actuating force necessary to overcome the reaction force on the diaphragm 121 and to unseat poppet valve 116.

A control valve of the type shown in Figure 4 will not only give a low-pressure crack point of the poppets but will also reduce the time factor involved in starting the power piston on its power stroke following initial displacement of fluid in the master cylinder.

It will be obvious to those skilled in the art that the objects of the invention may be attained by the use of constructions differing in certain respects from the illustrated embodiments without departing from the underlying principles of the invention.

We claim:

1. A power booster particularly adapted for use in a hydraulic braking system having a low displacement input side and a relatively high displacement output side comprising: a power cylinder, a pressure-responsive movable wall in said power cylinder, a hydraulic cylinder, a hydraulic cylinder piston for displacing hydraulic fluid in the hydraulic cylinder having a flow orifice therein for communicating the two sides of the system, a valve element for closing said orifice when said movable wall is caused to deliver a power stroke, a member for actuating said valve element, a hydraulically-actuated control valve for controlling the pressure differential across said movable wall, means defining a follow-up chamber in hydraulic communication with said control valve, a volume-displacement member in said follow-up chamber and movable with said hydraulic cylinder piston when the latter is caused to displace fluid in the hydraulic cylinder, and means operatively connecting said valve element actuating member and said volume displacement member to said movable wall in a manner such as to permit limited relative movement therebetween.

2. A power booster particularly adapted for use in a hydraulic braking system having a low displacement input side and relatively high displacement output side comprising: a power cylinder, a pressure-responsive movable wall in said power cylinder, a hydraulic cylinder, a hydraulic cylinder piston for displacing hydraulic fluid in the hydraulic cylinder having a flow orifice therein for communicating the two sides of the system, a valve element for closing said orifice when said movable wall is caused to deliver a power stroke, a member for actuating said valve element, a hydraulically-actuated control valve for controlling the pressure differential across said movable wall, means defining a follow-up chamber in hydraulic communication with said control valve, a hollow volume-displacement member connected to said hydraulic cylinder piston and projecting through said follow-up chamber, means providing sealing engagement between said volume-displacement member and said means defining a follow-up chamber, said valve element actuating member being movably disposed in said volume-displacement member, and means operatively connecting said last-named members to said movable wall.

3. A power booster particularly adapted for use in a hydraulic braking system having a low displacement input side and a relatively high displacement output side comprising: a power cylinder, a pressure-responsive movable wall in said power cylinder, a hydraulic cylinder, a hydraulic cylinder piston for displacing hydraulic fluid in the hydraulic cylinder having a flow orifice therein for communicating the two sides of the system, a valve element for closing said orifice when said movable wall is caused to deliver a power stroke, a hydraulically-actuated control valve for controlling the pressure differential across said movable wall, means defining a follow-up chamber in hydraulic communication with said control valve, a hollow volume-displacement member in said follow-up chamber connected at one end to said hydraulic cylinder piston and at its opposite end to said movable wall, and a member for actuating said valve element disposed in said volume displacement member and operatively connected to said movable wall.

4. A power booster as claimed in claim 3 wherein means are provided for connecting said volume displacement member and said valve element actuating member to the movable wall in a manner such as to effect seating of said valve element prior to fluid-displacing movement of said piston when said movable wall is caused to deliver a power stroke.

5. A power booster as claimed in claim 3 wherein said volume-displacement member and said piston are made as an integral unit.

6. A power booster particularly adapted for use in a hydraulic braking system having a low displacement input side and a relatively high displacement output side comprising: a power cylinder, a pressure responsive movable wall in said power cylinder, a hydraulic cylinder, a hydraulic cylinder piston for displacing hydraulic fluid in the hydraulic cylinder having a flow orifice therein for communicating the two sides of the system, a valve element for closing said orifice when said movable wall is caused to deliver a power stroke, a hydraulically-actuated control valve for controlling the pressure differential across said movable wall, means defining a follow-up chamber in hydraulic communication with said control valve, a hollow volume-displacement rod extending through said following-up chamber connected at one end to the hydraulic cylinder piston and at its opposite end to said movable wall, said piston having a land at its point of connection with said hollow volume displacement rod which constitutes a movable wall of said follow-up chamber, and a push rod connected at its one end to said movable wall and projecting through said hollow volume-displacement rod and at its opposite end carrying said valve element.

7. In a fluid pressure servomotor driven hydraulic fluid pressurizing device: a fluid pressure motor having an axially extending power chamber, a hydraulic chamber axially aligned with said power chamber at one end thereof, a piston in said hydraulic chamber dividing said hydraulic chamber into a fluid pressurizing chamber and a follow-up chamber, said piston having a generally axially extending opening therethrough communicating said follow-up and pressurizing chambers, said piston carrying a large diameter portion which projects through said follow-up chamber to provide a fluid displacement for said follow-up chamber less than approximately one-half of the fluid displacement of said fluid pressurizing chamber, a valve element which when moved in the direction of said fluid pressurizing chamber closes off said opening, a movable wall in said power chamber, and rod means operatively connecting said valve element to said movable wall for operating said valve element and moving said piston.

8. In a fluid pressure servomotor driven hydraulic fluid pressurizing device: a fluid pressure motor having an axially extending power chamber, a hydraulic chamber axially aligned with said power chamber at one end thereof, a piston in said hydraulic chamber dividing said hydraulic chamber into a fluid pressurizing chamber and a follow-up chamber, said piston having a generally axially extending opening therethrough communicating said follow-up and pressurizing chambers, said piston carrying a large diameter portion which projects through said follow-up chamber to provide a fluid displacement for said follow-up chamber less than approximately one-half of the fluid displacement of said fluid pressurizing chamber, a valve element which when moved in the direction of said fluid pressurizing chamber closes off said opening, a movable wall in said power chamber and comprising radially inner and outer portions movable axially relative to each other, rod means operatively connecting said inner portion to said valve element to operate the same, and means operatively connecting the outer portion of said movable wall to said piston to move it towards said fluid pressurizing chamber.

9. In a fluid pressure servomotor driven hydraulic fluid pressurizing device: a fluid pressure motor having an axially extending power chamber, a hydraulic chamber axially aligned with said power chamber at one end thereof, a piston in said hydraulic chamber dividing said hydraulic chamber into a fluid pressurizing chamber spaced from said power chamber and a follow-up chamber adjacent said power chamber, said piston having a large diameter portion which projects through said follow-up chamber into said power chamber to provide a fluid displacement for said follow-up chamber less than one-half of the fluid displacement of said fluid pressurizing chamber, said piston also having a valve chamber therein with a generally axially positioned annular valve seat facing said power chamber and whose port communicates with said fluid pressurizing chamber, means communicating said follow-up chamber to said valve chamber, said large diameter portion also having an axially extending opening communicating said valve chamber with said power chamber, the end of said opening adjacent said movable wall in said power chamber being counterbored, a first rod projecting from said counterbore into said valve chamber for abutment with said valve seat, a second rod carried by said piston and projecting into said counterbore and aligned with the end of said first rod on a nonmetallic cup shaped member positioned over the end of said second rod to guide said second rod in said counterbore and through which force is transmitted to said first rod.

10. In a power booster for hydraulic systems, a piston for displacing hydraulic fluid having an orifice therein, a power cylinder, a power piston movable in said cylinder for actuating said displacement piston, means for establishing a pressure differential across the power piston, a valve element for closing said orifice when the power piston is caused to deliver a power stroke, said power piston having first and second portions, said first portion being adapted to respond to low differential pressures prior to response of said second portion of the power piston, means operatively connecting said first portion of said power piston to said valve element for closing said orifice upon movement of said first portion of said power piston, and means connecting said displacement piston to said second portion of the power piston.

11. In a power booster for hydraulic systems, a piston for displacing hydraulic fluid having an orifice therein, a power cylinder, a power piston movable in said cylinder for actuating said displacement piston, said power piston comprising a circularly shaped center portion and an annularly shaped outer portion, said portions being movable relative to each other, means for establishing a pressure differential across the power piston, a valve element for closing said orifice when the power piston is caused to deliver a power stroke, an elongated hollow member for transmitting motion from the outer annularly shaped portion of the power piston to the displacement piston, and a rod member for transmitting motion from the circularly shaped center portion of the power piston to said valve element and projecting through said hollow member.

References Cited in the file of this patent

UNITED STATES PATENTS

| | | |
|---|---|---|
| 2,526,236 | Ingres | Oct. 17, 1950 |
| 2,536,461 | Price | Jan. 2, 1951 |
| 2,598,604 | Ringer | May 27, 1952 |
| 2,671,431 | Zumbusch | Mar. 9, 1954 |
| 2,688,314 | Holm et al. | Sept. 7, 1954 |
| 2,735,268 | Stelzer | Feb. 21, 1956 |
| 2,770,949 | Randol | Nov. 20, 1956 |
| 2,832,316 | Ingres | Apr. 29, 1958 |